US009409288B1

(12) United States Patent
Huene

(10) Patent No.: US 9,409,288 B1
(45) Date of Patent: Aug. 9, 2016

(54) AWNING EXTENSION ADJUSTMENT DEVICE

(71) Applicant: David J. Huene, Cumming, GA (US)

(72) Inventor: David J. Huene, Cumming, GA (US)

( * ) Notice: Subject to any disclaimer, the term of this patent is extended or adjusted under 35 U.S.C. 154(b) by 379 days.

(21) Appl. No.: 14/163,132

(22) Filed: Jan. 24, 2014

Related U.S. Application Data

(60) Provisional application No. 61/759,103, filed on Jan. 31, 2013.

(51) Int. Cl.
*B25J 1/00* (2006.01)

(52) U.S. Cl.
CPC .......................................... *B25J 1/00* (2013.01)

(58) Field of Classification Search
CPC ................ B25J 1/00; B25J 1/04; B25B 13/48
USPC ......... 160/66, 67, 310; 81/53.1, 176.1, 176.2; 294/86.4
See application file for complete search history.

(56) References Cited

U.S. PATENT DOCUMENTS

| | | | | |
|---|---|---|---|---|
| 5,232,036 | A | 8/1993 | Brutsaert | |
| D345,288 | S | 3/1994 | Hubal et al. | |
| 5,921,305 | A | 7/1999 | Grudl | |
| 6,230,582 | B1 | 5/2001 | Becker et al. | |
| 6,591,716 | B2 * | 7/2003 | Wantz | B28B 9/00 294/210 |
| 6,752,193 | B1 | 6/2004 | Molloy | |
| 6,782,936 | B1 | 8/2004 | Girard et al. | |
| 2009/0320651 | A1 * | 12/2009 | Kramer | B25B 13/04 81/176.2 |

* cited by examiner

*Primary Examiner* — David B Thomas

(57) ABSTRACT

An awning extension adjustment device selectively loosens and tightens an adjustment knob of an awning extension assembly from an extended distance. The device includes a shaft and a hook coupled to the shaft extending from a first end of the shaft. An engagement member is coupled to a second end of the shaft. The engagement member has an outward face directed away from the shaft. Each of a plurality of protrusions extends from the outward face of the engagement member. The protrusions are arranged on the outward face of the engagement member wherein the protrusions engage an adjustment knob coupled to an extension arm of a frame of an extendable awning wherein rotation of the shaft and the engagement member rotates the adjustment knob.

15 Claims, 5 Drawing Sheets

AWNING EXTENSION ADJUSTMENT DEVICE

CROSS-REFERENCE TO RELATED APPLICATIONS

This non-provisional application claims the priority of the provisional application 61/759,103 filed Jan. 31, 2013.

BACKGROUND OF THE DISCLOSURE

Field of the Disclosure

The disclosure relates to hold tool devices and more particularly pertains to a new hold tool device for selectively loosening and tightening an adjustment knob of an awning extension assembly from an extended distance.

SUMMARY OF THE DISCLOSURE

An embodiment of the disclosure meets the needs presented above by generally comprising a shaft and a hook coupled to the shaft extending from a first end of the shaft. An engagement member is coupled to a second end of the shaft. The engagement member has an outward face directed away from the shaft. Each of a plurality of protrusions extends from the outward face of the engagement member. The protrusions are arranged on the outward face of the engagement member wherein the protrusions engage an adjustment knob coupled to an extension arm of a frame of an extendable awning wherein rotation of the shaft and the engagement member rotates the adjustment knob.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
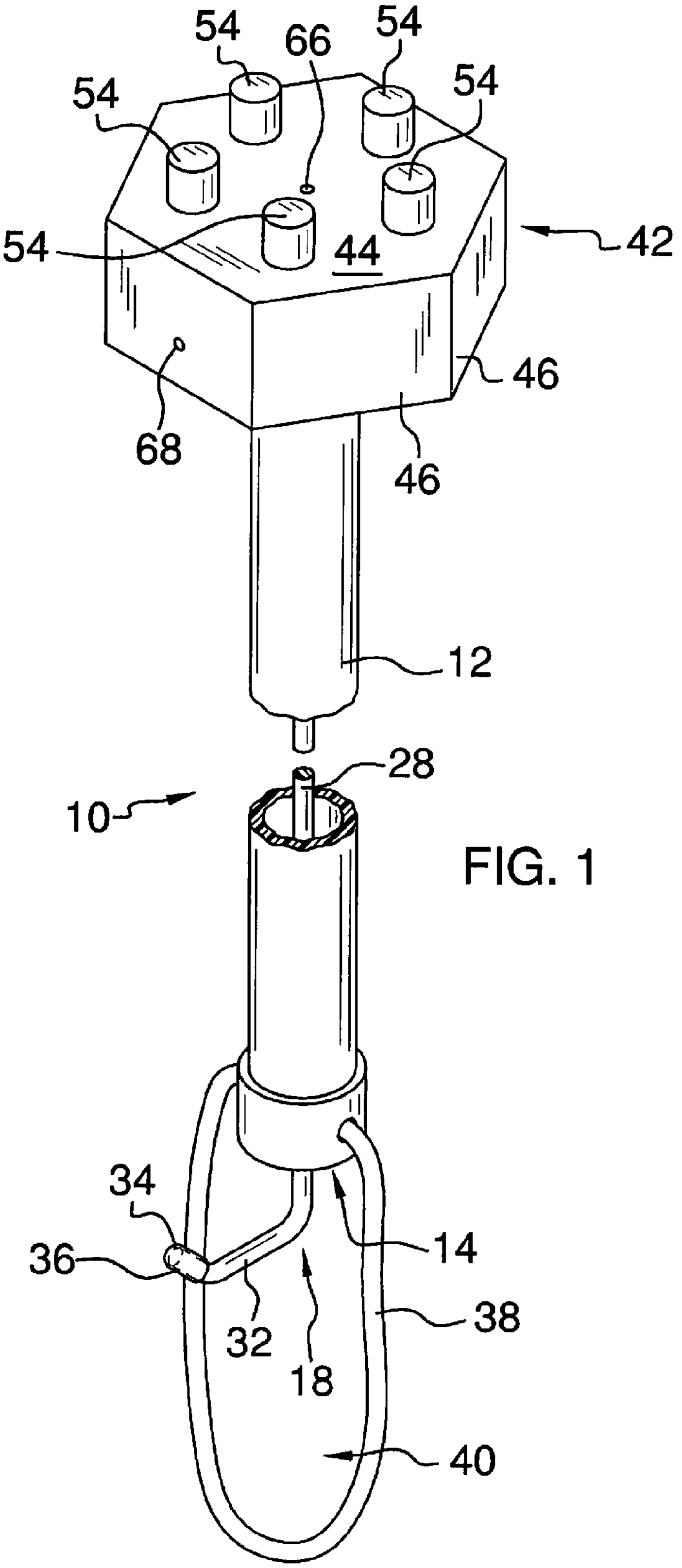
FIG. 1 is a top front side perspective view of a awning extension adjustment device according to an embodiment of the disclosure.
Figure 2:
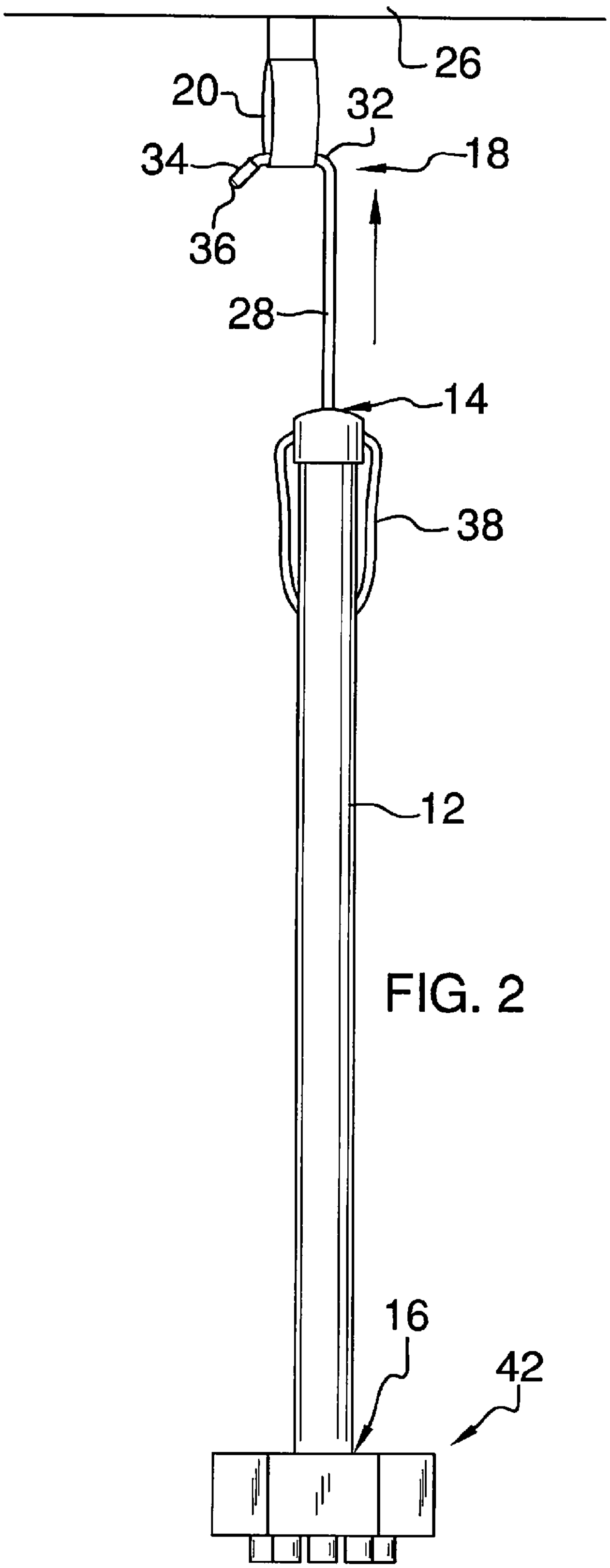
FIG. 2 is an inverted side view of an embodiment of the disclosure.
Figure 3:
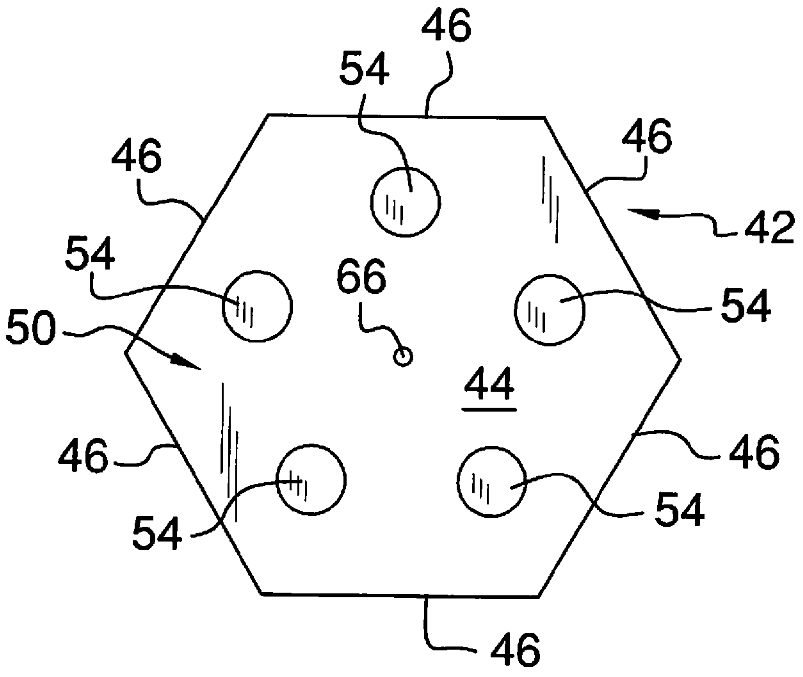
FIG. 3 is a top view of an embodiment of the disclosure.
Figure 4:
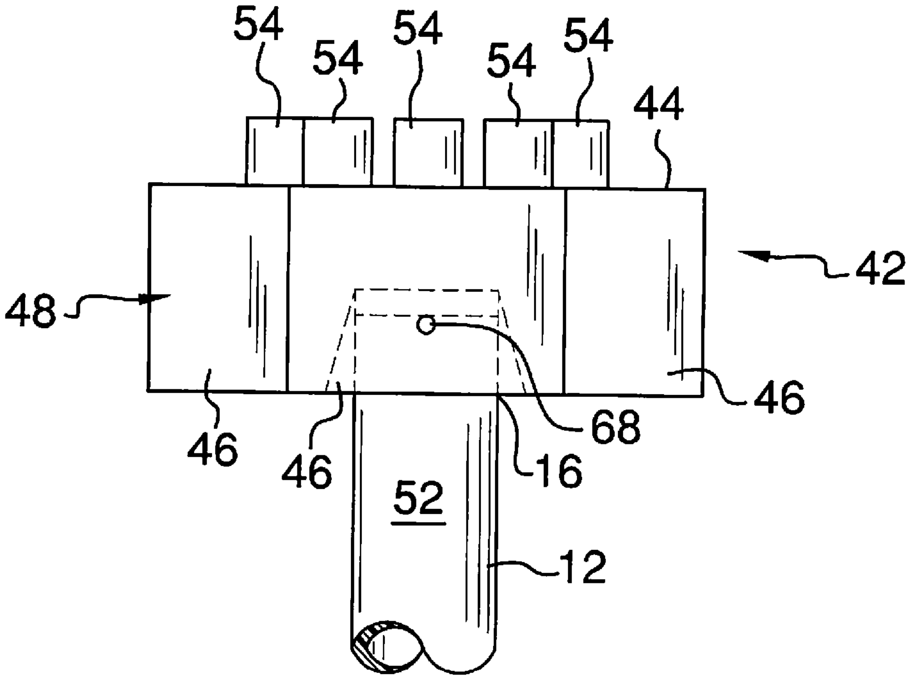
FIG. 4 is a partial front view of an embodiment of the disclosure.
Figure 5:
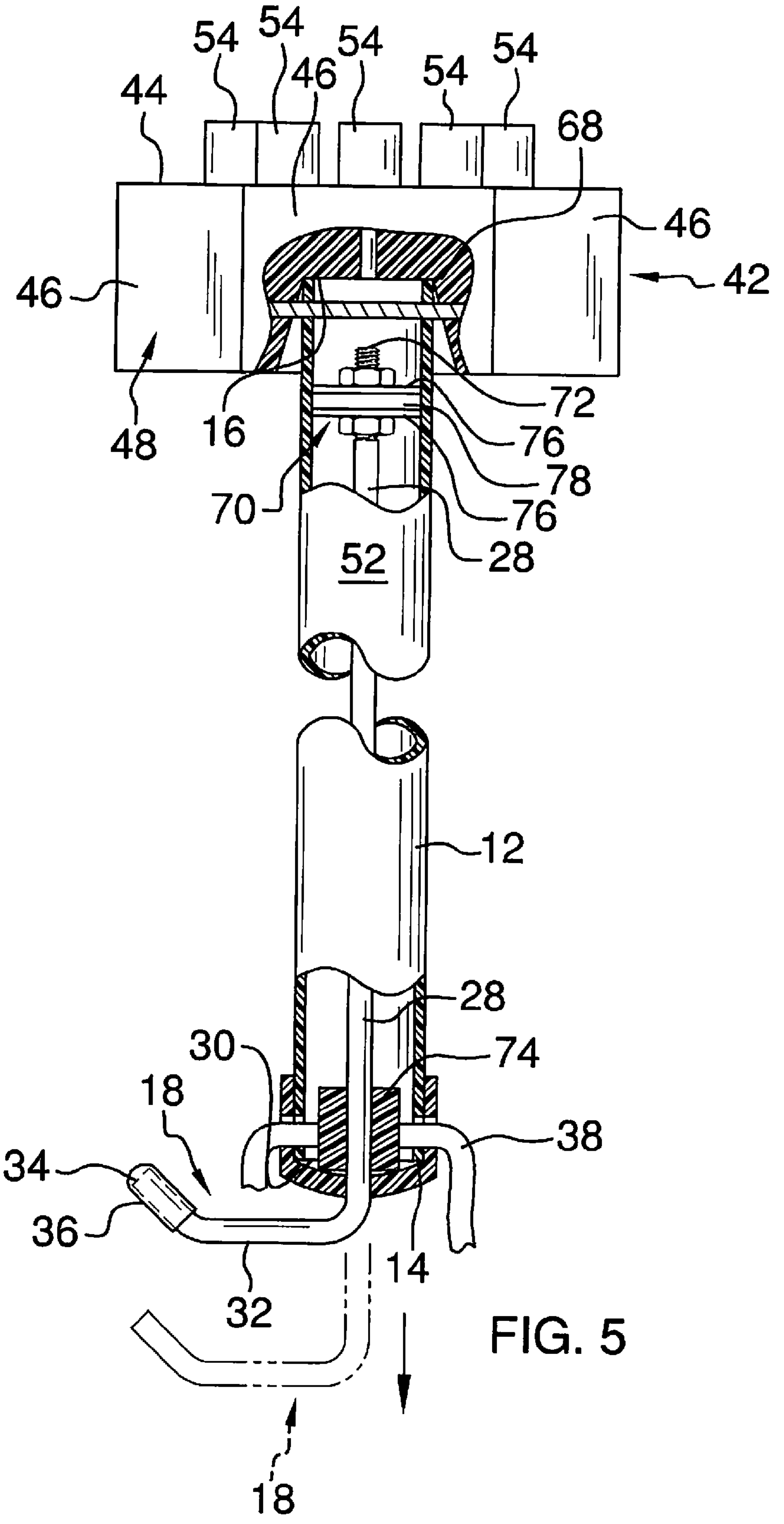
FIG. 5 is a partial cut-away side view of an embodiment of the disclosure.
Figure 6:
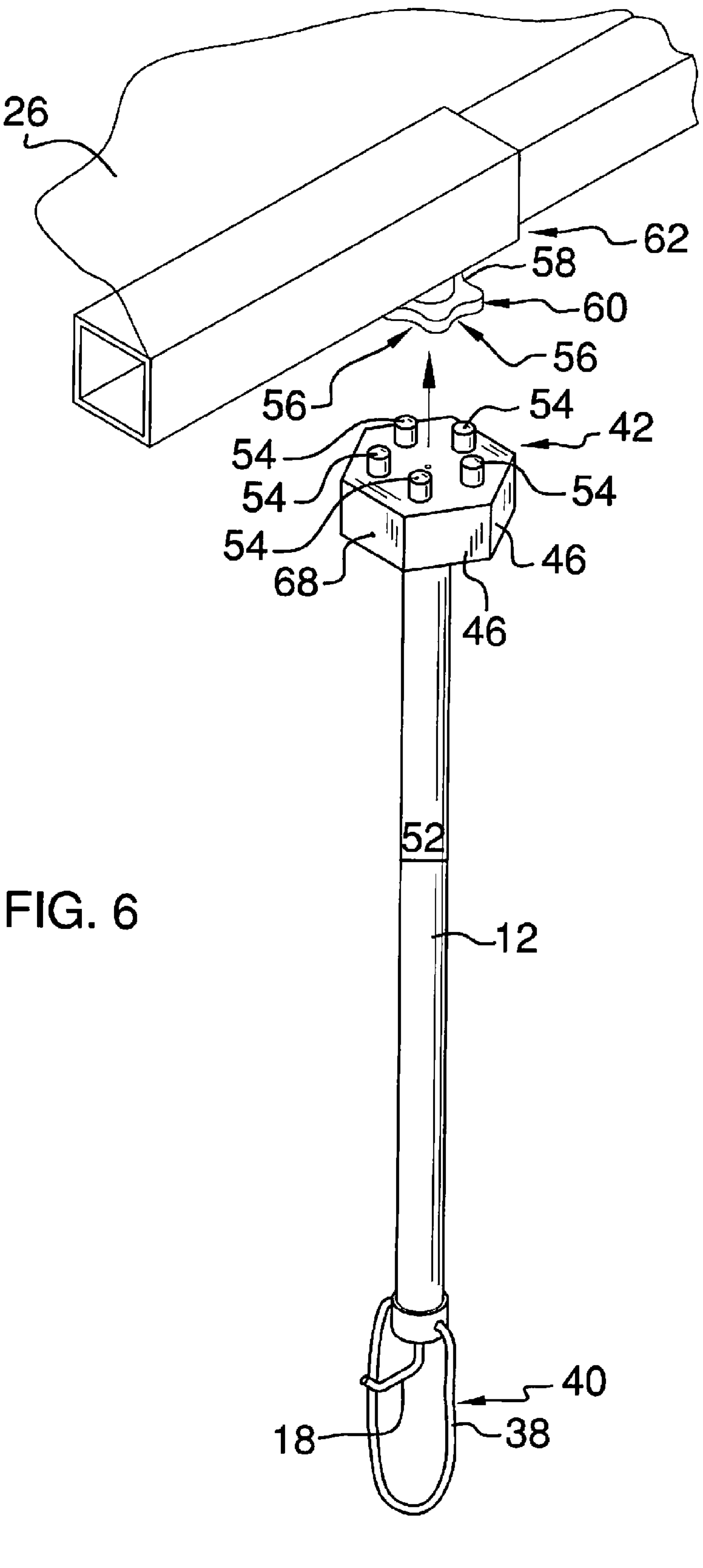
FIG. 6 is a partially exploded top front side view of an embodiment of the disclosure in use.

With reference now to the drawings, and in particular to FIGS. 1 through 6 thereof, a new hold tool device embodying the principles and concepts of an embodiment of the disclosure and generally designated by the reference numeral 10 will be described.

As best illustrated in FIGS. 1 through 6, the awning extension adjustment device 10 generally comprises an elongated shaft 12 having a first end 14 and a second end 16. A hook 18 is coupled to the shaft 12. The hook 18 extends from the first end 14 of the shaft 12. The hook 18 is configured for engaging a ring 20 used to extend an extendable awning 26. The hook 18 is telescopically extendable from the first end 14 of the shaft 12. The hook 18 has a substantially straight proximal section 28 relative to the shaft 12. The proximal section 28 is slidable into the shaft 12 through an aperture 30 in the first end 14 of the shaft 12. The hook 18 has a distal section 32 relative to the shaft 12. The distal section 32 extends from the proximal section 28 of the hook 18. The distal section 32 is oriented substantially transverse to the proximal section 28. The distal section 32 of the hook 18 may be substantially straight. The distal section 32 may also include a bent end portion 34 distally positioned relative to the proximal section 28 of the hook 18 and extending back towards the first end 14 of the shaft 12. Thus, the distal section 32 of the hook 18 is configured for facilitating retention of the loop 20 on the hook 18. A protective cap 36 may be positioned on the bent end portion 34 of the distal section 32 of the hook 18. The protective cap 36 may be constructed of rubber, plastic, or the like. The shaft 12 and hook 18 combined may have a length extendable from between 35 and 45 centimeters to between 50 to 70 centimeters.

A washer 70 complementary to an interior size of the shaft 12 may be coupled to the proximal section 28 of the hook 18 adjacent to an interiorly positioned end 72 of the proximal section 28 within the shaft 12. The proximal section 28 may pass through a stop 74 positioned in the shaft 12 adjacent to the first end 14 of the shaft 12. The proximal section 28 is slidable through the stop 74 until the washer 70 contacts the stop 74 preventing the hook 18 from being fully disengaged from the shaft 12. The washer 70 may comprise a pair of stiff outer layers 76 sandwiching an interior layer 78 constructed of a soft material such as felt or the like to facilitate smooth extension of the hook 18 without undesirable sounds being produced by the washer 70 scraping on the shaft 12.

A line 38 is coupled to and extends from the shaft 12. The line is positioned proximate the first end 14 of the shaft 12. The line 38 forms a loop 40 extendable outwardly from the first end 14 of the shaft 12 wherein the shaft 12 is hangable in a substantially vertical position from a connector extending from a recreational vehicle or other structure to which the extendable awning 26 is coupled. Thus, the device 10 may be easily stored near the potential site of use.

An engagement member 42 is coupled to the shaft 12. The engagement member 42 is coupled to the second end 16 of the shaft 12. The engagement member 42 has an outward face 44 directed away from the shaft 12. The outward face 44 is substantially planar. The outward face 44 is substantially transverse to the shaft 12. The engagement member has a plurality of flat surfaces 46 defining an outer perimeter wall 48 of the engagement member 42. The outer perimeter wall 48 has a geometric cross-sectional shape 50 transverse to the shaft 12. The outer perimeter wall 48 is outwardly spaced from an outer surface 52 of the shaft 12 wherein the flat surfaces 46 of the outer perimeter wall 48 of the engagement member 42 are configured to abut a vertical surface when the shaft 12 is hung from the connector coupled to the vertical surface. Thus, the outer perimeter wall 48 of the engagement member 42 inhibits movement of the shaft 12 relative to the vertical surface while one of the flat surfaces 46 abuts the vertical surface. The engagement member 42 may be attached to the shaft 12 by a pin 68 permitting the engagement member 42 to pivot relative to the second end 16 of the shaft 12 but rotating the engagement member 42 when the shaft 12 is rotated. The engagement member 42 may have a thickness between 3 and 6 centimeters.

Each of a plurality of protrusions 54 extends from the outward face 44 of the engagement member 42. The protrusions 54 are radially arranged on the outward face 44 of the engagement member 42 wherein the protrusions 54 are configured to abut inwardly arced sections 56 of a perimeter edge 58 of an adjustment knob 60 coupled to an extension arm 60 of a frame 62 of the extendable awning 26 such that rotation of the shaft 12 and the engagement member 42 rotates the adjustment knob 60. The plurality of protrusions 54 may be exactly five equally spaced protrusions 64 equidistant from a center 66 of the outward face 44 of the engagement member 42.

In use, the hook 18 extendable from the first end 14 of the shaft 12 is used to engage the loop 20 to facilitate initial extension of the extendable awning 26. The engagement member 42 is then abutted against the adjustment knob 60 and the shaft rotated to selectively loosen or tighten the adjustment knob 60 as needed to position and secure the extendable awning 26 in a desired position without undue reaching by the user. The device 10 is then stored by hanging from the loop 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An awning extension adjustment device comprising:

a shaft having a first end and a second end;

a hook coupled to said shaft, said hook extending from said first end of said shaft;

an engagement member, said engagement member being coupled to said shaft, said engagement member being coupled to said second end of said shaft, said engagement member having an outward face directed away from said shaft; and a plurality of protrusions extending from said outward face of said engagement member, said protrusions being arranged on said outward face of said engagement member wherein said protrusions are configured to engage an adjustment knob coupled to an extension arm of a frame of an extendable awning such that rotation of said shaft and said engagement member rotates the adjustment knob.

2. The device of claim 1, further comprising said hook being configured for engaging a loop on an end of an extension strap coupled to an extendable awning.

3. The device of claim 2, further comprising said hook being telescopically extendable from said first end of said shaft.

4. The device of claim 3, further comprising said hook having a substantially straight proximal section relative to said shaft, said proximal section being slidable into said shaft through an aperture in said first end of said shaft.

5. The device of claim 4, further comprising said hook having a distal section relative to said shaft, said distal section extending from said proximal section of said hook, said distal section being oriented substantially transverse to said proximal section of said shaft.

6. The device of claim 5, further comprising said distal section of said hook being substantially straight.

7. The device of claim 1, further comprising a line coupled to and extending from said shaft, said line being positioned proximate said first end of said shaft, said line forming a loop extendable outwardly from said first end of said shaft wherein said shaft is hangable in a substantially vertical position.

8. The device of claim 1, further comprising said outward face being substantially planar.

9. The device of claim 8, further comprising said outward face being substantially transverse to said shaft.

10. The device of claim 1, further comprising said engagement member having a plurality of flat surfaces defining an outer perimeter wall of said engagement member.

11. The device of claim 10, further comprising said outer perimeter wall having a geometric cross-sectional shape transverse to said shaft.

12. The device of claim 11, further comprising said outer perimeter wall being outwardly spaced from an outer surface of said shaft wherein said flat surfaces of said outer perimeter wall of said engagement member are configured to abut a vertical surface when said shaft is hung from a connector coupled to the vertical surface wherein said outer perimeter wall of said engagement member inhibits movement of said shaft relative to the vertical surface while one of said flat surfaces abuts the vertical surface.

13. The device of claim 1, further comprising said protrusions being radially arranged to abut inwardly arced sections of a perimeter edge of the adjustment knob.

14. The device of claim 13, further comprising said plurality of protrusions being exactly five equally spaced protrusions equidistant from a center of said outward face of said engagement member.

15. An awning extension adjustment device comprising:

a shaft having a first end and a second end;

a hook coupled to said shaft, said hook extending from said first end of said shaft, said hook being configured for engaging a loop on an end of an extension strap coupled to an extendable awning, said hook being telescopically extendable from said first end of said shaft, said hook having a substantially straight proximal section relative to said shaft, said proximal section being slidable into said shaft through an aperture in said first end of said shaft, said hook having a distal section relative to said shaft, said distal section extending from said proximal section of said hook, said distal section being oriented substantially transverse to said proximal section of said shaft, said distal section of said hook being substantially straight;

a line coupled to and extending from said shaft, said line being positioned proximate said first end of said shaft, said line forming a loop extendable outwardly from said first end of said shaft wherein said shaft is hangable in a substantially vertical position;

an engagement member, said engagement member being coupled to said shaft, said engagement member being coupled to said second end of said shaft, said engagement member having an outward face directed away from said shaft, said outward face being substantially planar, said outward face being substantially transverse to said shaft, said engagement member having a plurality of flat surfaces defining an outer perimeter wall of said engagement member, said outer perimeter wall having a geometric cross-sectional shape transverse to said shaft, said outer perimeter wall being outwardly spaced from an outer surface of said shaft wherein said flat surfaces of said outer perimeter wall of said engagement member are configured to abut a vertical surface when said shaft is hung from a connector coupled to the vertical surface wherein said outer perimeter wall of said engagement member inhibits movement of said shaft relative to the vertical surface while one of said flat surfaces abuts the vertical surface; and a plurality of protrusions extending from said outward face of said engagement member, said protrusions being radially arranged on said outward face of said engagement member wherein said protrusions are configured to abut inwardly arced sections of a perimeter edge of an adjustment knob coupled to an extension arm of a frame of an extendable awning such that rotation of said shaft and said engagement member rotates the adjustment knob, said plurality of protrusions being exactly five equally spaced protrusions equidistant from a center of said outward face of said engagement member.

* * * * *